Figure 1:
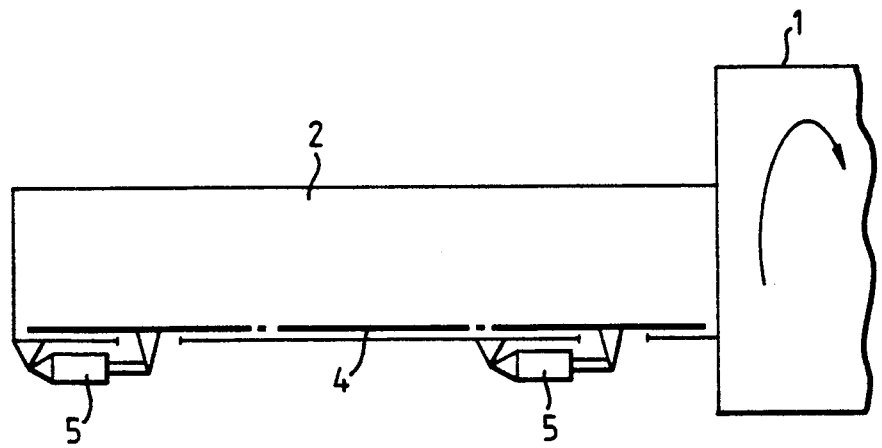

United States Patent [19]

Jonkka

[11] Patent Number: 5,063,981
[45] Date of Patent: Nov. 12, 1991

[54] METHOD AND MEANS OF CONVEYANCE OF SOLID MATTER IN PIECES OR PARTICLES

[75] Inventor: Arvo Jonkka, Pori, Finland

[73] Assignee: Rauma-Repola Oy, Pori, Finland

[21] Appl. No.: 544,917

[22] Filed: Jun. 28, 1990

[30] Foreign Application Priority Data

| Jul. 3, 1989 [FI] | Finland | 893230 |
| Sep. 18, 1989 [FI] | Finland | 894387 |
| Mar. 21, 1990 [FI] | Finland | 901423 |

[51] Int. Cl.$^5$ ............ B27L 1/00; B65G 25/00
[52] U.S. Cl. ............ 144/341; 144/208 B; 144/242; 144/246 R; 198/750
[58] Field of Search ........ 144/242 R, 246 R, 208 B, 144/341; 198/750

[56] References Cited

U.S. PATENT DOCUMENTS

| 2,214,755 | 9/1940 | Tafel | 198/750 |
| 2,248,841 | 7/1941 | Anderson | 198/750 |
| 4,180,109 | 12/1979 | Heikkinen | 144/246 R |
| 4,374,533 | 2/1983 | Svensson | 144/208 B |
| 4,709,805 | 12/1987 | Foster | 198/750 |
| 4,784,198 | 11/1988 | Pallmann | 144/242 R |

FOREIGN PATENT DOCUMENTS 823652 11/1987 Norway.

Primary Examiner—W. Donald Bray
Attorney, Agent, or Firm—Burns, Doane, Swecker & Mathis

[57] ABSTRACT

Method and means of conveyance for solid material, f.ex. tree trunks (6) or bark, whereby the solid material is conveyed with parallel, oblong transfer elements (4) moving back and forth in transfer direction. A larger part of the surface of the transfer elements (4) is moving forward at a time than moving backward. The speed of the return motion of the transfer elements is higher than that of the feed motion of the transfer elements. Transfer elements (4) at sides of the conveyor have been inclined on their longitudinal axis so that they slope towards the center of the conveyor. In this way the friction force between the particles (6) of the material to be conveyed is increased and the friction force between the material (6) to be conveyed and the transfer elements (4) is decreased.

17 Claims, 3 Drawing Sheets

METHOD AND MEANS OF CONVEYANCE OF SOLID MATTER IN PIECES OR PARTICLES

This invention concerns a method for conveyance of solid matter that is in pieces or particles, for example tree trunks or bark in a way that the solid matter is conveyed by parallel, oblong transfer elements moving back and forth in transfer direction, wherein a larger part of the surface of transfer elements in connection with the material to be conveyed is moving forward at a time than moving backward, and the speed of the return motion of the transfer elements is higher than that of the feed motion of the transfer elements. The invention also concerns a means of conveyance for solid matter that is in pieces or particles, for example tree trunks or bark, consisting of parallel, oblong transfer elements movable back and forth in transfer direction, wherein a larger part of the surface of transfer elements in connection with the material to be conveyed is moving forward at a time than moving backward and the speed of the return motion of the transfer elements is higher than that of the feed motion of the transfer elements.

In front of barking drums generally used for debarking of trees it is known to use a trough-formed feeding unit equipped with a conveyor, where the trunks to be debarked are led in. As the debarking length of trunks to be debarked has increased it is becoming general to transport trunks lengthwise. As conveyor on the bottom of the trough it has been used endless, parallel arranged chains that are furnished with pushers projecting upwards. These pushers cling to the stump end of trunks and push the trunks lengthwise towards the open end of the barking drum. This kind of feeder unit is described f.ex. in FI-patent application 86 4827. The problem with these chain conveyors is the fact that each link is loaded by big loads and the wearing of links of flexible chains. For this reason the chains can easily break.

Also the so called "stoker feeder" is known, that is, a back and forth moving feeder furnished with projecting pushers. This kind of feeder moving back and forth has earlier been used for unloading of bulk material, f.ex. chip from a silo.

The method in accordance with this invention is characterized in that by inclining the edges of transfer elements at sides of the conveyor the internal friction force of the material to be conveyed or the friction force between the pieces or particles is increased, whereby the relative friction force between the material to be conveyed and the transfer elements is decreased. The conveyor in accordance with this invention is characterized in that the transfer elements at sides of the conveyor have been inclined on their longitudinal axis so that they slope towards the centre of the conveyor.

Figure 2:
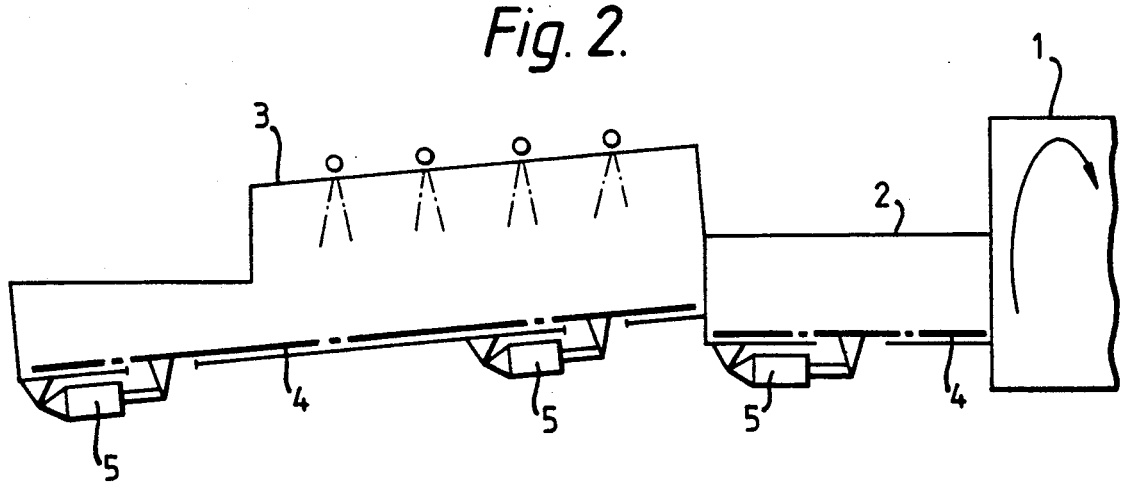
Figure 3:
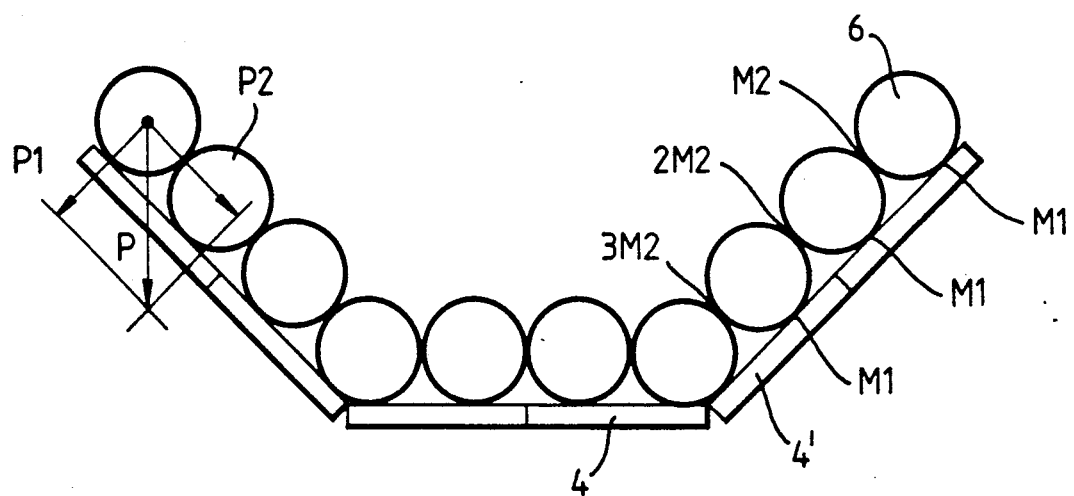
Figure 4:
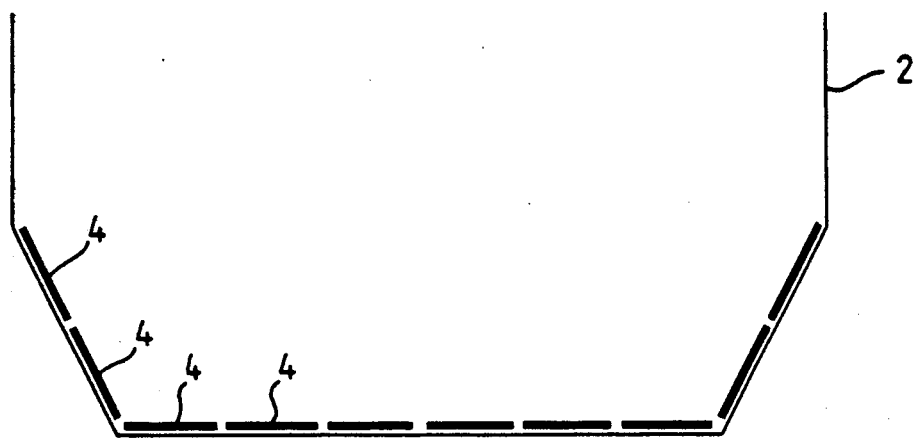
Figure 5:
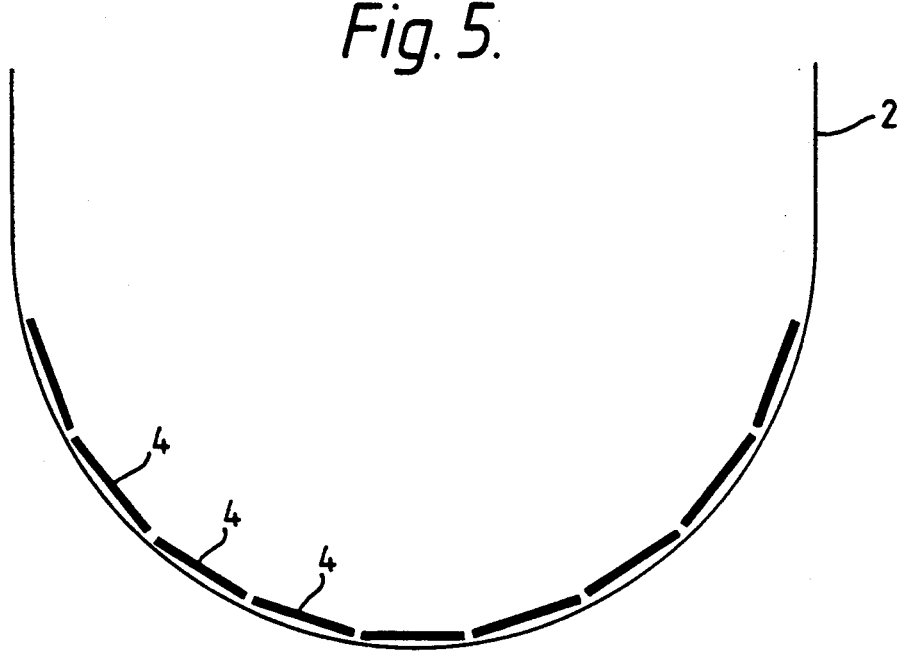

The conveyor in accordance with this invention is usable for example for tree trunks and chip and bark material from trees. A part of or all parts of the transfer elements have been inclined towards the centre of the conveyor. Therefore the material to be conveyed, effected by the slope surface, tends to move towards the centre of the conveyor, and the internal friction force sidewards between the particles of the material grows stronger than the friction force between the material and the transfer elements. So the material on transfer elements moving backwards is prevented from sliding backwards together with the transfer elements. The mode of construction in accordance with the invention is very simple. As the weight of the material to be conveyed is distributed evenly on the whole surface of the transfer elements, high load peaks can be avoided. Therefore the whole construction can be made lighter. The invention and its details will be described in more detail in the following with reference to the attached drawings, wherein FIG. 1 shows a side section of a barking drum with the feeding unit in accordance with the invention, FIG. 2 shows an alternative application, FIG. 3 shows a cross section of a feeding device with trunks loaded in and FIGS. 4 and 5 show two different alternatives of the feeder in cross section.

The barking drum 1 is known in itself and there is no need to describe it in more detail in this connection. In front of the barking drum there is a trough-formed, open-top feeding unit 2. Trunks or trunk bundles to be debarked can be led either to the feeding unit 2 or in winter alternatively to the front end of the defrosting unit 3 in front of the feeding unit 2 (FIG. 2). The defrosting unit can also be connected straight to the drum in which case no separate feeding unit between the defrosting unit and the drum is required.

Sides of the bottom of the feeding unit 2 and the defrosting unit 3 consist of several parallel longitudinal steel bars or blocks 4. Top surface of the blocks 4 can be f.ex. like a level or like V or V upside down in cross-sectional shape. It is essential that all the surfaces of the block that come into contact with material to be conveyed are parallel with the feeding direction. If the blocks are inclined, the width of each block can be increased. Main part of the bottom of the feeder are covered by the blocks and the weight of the material to be conveyed rests mostly on top of the blocks.

The blocks 4 are moved back and forth by hydraulic cylinders 5 placed either in their ends or below them. The feeding speed towards the drum 1 is only a fraction of the speed of the return motion. It is essential that the total surface area of the blocks in feed motion at a time is bigger than the total surface area of the blocks in return motion at the same time. Correspondingly, the speed of the return motion must have the same proportion to the feed motion as the proportion of the total surface area of blocks in feed motion to the total surface area of blocks in return motion.

FIG. 3 shows a cross section of a feeding equipment in accordance with the invention, loaded with trunks 6, which enables a big transport capacity even for relatively big trunks. Also the broad transfer elements 4 function well because the side blocks 4' inclined towards the centre of the conveyor effect fiction force M2 that grows schematically in accordance with FIG. 3 M2, 2M2, 3M2 etc. A suitable inclination of blocks 4' effects a stronger friction force between the trunks than the friction M1 between the trunks and the blocks 4'. When the inclination of the side blocks 4' is 45°, the transport condition of the outermost block is M2 > M1 with a horizontal conveyor.

For other blocks 4 the system in accordance with the invention effects a considerably stronger friction between the particles of the material than between the transfer element 4 and the material.

Transport capacity of the outermost blocks 4' can be improved by increasing their inclination angle f.ex. in accordance with FIGS. 4 and 5.

Transfer element arrangements in accordance with FIGS. 3, 4 and 5 also effect that during the return motion of the block 4 the material tends to slide towards the centre of the conveyor from the sides and to compress, which improves the transport capacity.

The invention is not restricted to the applications presented above but it can be alternated within the framework of the claims.

Hydraulic cylinders 5 can be fitted either to the end of the blocks 4 or below them. The back and forth motion of the blocks 4 can be effected except with hydraulic cylinders also with any other mechanism, f.ex. with an electric system or with a tumbling shaft.

The top surface of the blocks can also be grooved parallel with the feeding direction.

In case the bottom of the defrosting unit 3 in the application in accordance with FIG. 2 is very much inclined so that it slopes upwards in feeding direction the above described blocks cannot be used as such, but they have to be furnished with projections of a pusher type in order to make sure that the feeded material rises upwards along the inclined surface.

The invention can also be applied to the feeding of chip or bark. The equipment is suitable for conveyance of any material in cases where a stronger friction force is effected, by the inclined side blocks, between particles of the material than the friction is between the blocks and the material.

A very fluent feeding of the barking drum with wood can be achieved by using a cross section of the feeding unit 2 in accordance with FIG. 5, where the long trunks can be prevented from breaking between the revolving barking drum 1 and the feeding unit 2. Because the feeding unit 2 according to the invention has in feeding direction smooth surfaces on the blocks 4, the feeding force is prevented from pushing the whole drum 1 violently forward. Currently used feeling devices are equipped with pushers or jags that in certain situations effect a force that breaks trunks or equipment. In the new feeding unit 2 the trunks slide backwards when necessary when the counterforce exceeds the friction.

I claim:

1. A method of conveying pieces of material comprising the steps of:
    placing said pieces of material onto a support surface area of a conveyor formed of a plurality of parallel oblong transfer elements;
    simultaneously moving a predetermined number of said transfer elements in a forward motion and a predetermined number of said transfer elements in a return motion along a line parallel to a conveying direction such that said support surface area of said conveyor includes a forward moving surface area and a return moving surface area, wherein at any predetermined period of time, said forward moving surface area is in contact with said pieces of material and is larger than said return moving surface area, and wherein the speed of said return motion is higher than the speed of the forward motion;
    urging said pieces of material through said conveyor wherein a first frictional force between each of the pieces is increased as a result of positioning outermost transfer elements at an angle relative to a horizontal plane, said first frictional force being greater than a second frictional force existing between the pieces of material that are being conveyed and the transfer elements.

2. A means for conveying pieces of material comprising:
    frame means;
    a plurality of oblong shaped transfer elements positioned substantially parallel to each other along a conveying direction on said frame means to form a conveyor with a predetermined surface area, said transfer elements being movable in a forward and return motion along a line parallel to said conveying direction such that said conveyor has a forward moving surface area and a return moving surface area at any particular period of time; said forward moving surface area being in contact with said pieces of material and being larger than said return moving surface area at any particular period of time;
    means for moving each of said plurality of transfer elements at a return speed of movement that is greater than a forward speed of movement; and
    outermost transfer elements of said conveyor being inclined relative to a horizontal plane such that said outermost transfer elements slope towards a center of said conveyor.

3. A means for conveying pieces of material as set forth in claim 2, wherein transfer elements on either side of a center region of said conveyor are positioned at an angle of inclination relative to said horizontal plane such that said conveyor has a substantially semi-circular cross-section.

4. A means for conveying pieces of material as set forth in claim 2, wherein said plurality of transfer elements are positioned to receive a substantial portion of a primary contact surface area of each of said pieces of material.

5. A means for conveying pieces of material as set forth in claim 2, further comprising a drum means for debarking tree trunks positioned adjacent said conveyor, said drum means having a revolving feed opening, said feed opening having a bottom form conforming to a bottom form of said transfer elements of said conveyor, said transfer elements extending across an end face of said drum means at said feed opening.

6. A means for conveying pieces of material as set forth in claim 2, wherein said plurality of transfer elements include transfer surfaces, said transfer surfaces being arranged parallel to said conveying direction, said transfer surfaces having a frictional surface for creating a feeding frictional force by which said pieces of material are conveyed.

7. A means for conveying pieces of material as set forth in claim 3, wherein said plurality of transfer elements are positioned to receive a substantial portion of a primary contact surface area of each of said pieces of material.

8. A means for conveying pieces of material as set forth in claim 3, further comprising a drum means for debarking tree trunks positioned adjacent said conveyor, said drum means having a revolving feed opening, said feed opening having a bottom form conforming to a bottom form of said transfer elements of said conveyor, said transfer elements extending across an end face of said drum means at said feed opening.

9. A means for conveying pieces of material as set forth in claim 4, further comprising a drum means for debarking tree trunks positioned adjacent said conveyor, said drum means having a revolving feed opening, said feed opening having a bottom form conforming to a bottom form of said transfer elements of said conveyor, said transfer elements extending across an end face of said drum means at said feed opening.

10. A means for conveying pieces of material as set forth in claim 7, further comprising a drum means for debarking tree trunks positioned adjacent said conveyor, said drum means having a revolving feed opening, said feed opening having a bottom form conforming to a bottom form of said transfer elements of said conveyor, said transfer elements extending across an end face of said drum means at said feed opening.

11. A means for conveying pieces of material as set forth in claim 3, wherein said plurality of transfer elements include transfer surfaces, said transfer surfaces being arranged parallel to said conveying direction, said transfer surfaces having a frictional surface for creating a feeding frictional force by which said pieces of material are conveyed.

12. A means for conveying pieces of material as set forth in claim 4, wherein said plurality of transfer elements include transfer surfaces, said transfer surfaces being arranged parallel to said conveying direction, said transfer surfaces having a frictional surface for creating a feeding frictional force by which said pieces of material are conveyed.

13. A means for conveying pieces of material as set forth in claim 5, wherein said plurality of transfer elements include transfer surfaces, said transfer surfaces being arranged parallel to said conveying direction, said transfer surfaces having a frictional surface for creating a feeding frictional force by which said pieces of material are conveyed.

14. A means for conveying pieces of material as set forth in claim 7, wherein said plurality of transfer elements include transfer surfaces, said transfer surfaces being arranged parallel to said conveying direction, said transfer surfaces having a frictional surface for creating a feeding frictional force by which said pieces of material are conveyed.

15. A means for conveying pieces of material as set forth in claim 8, wherein said plurality of transfer elements include transfer surfaces, said transfer surfaces being arranged parallel to said conveying direction, said transfer surfaces having a frictional surface for creating a feeding frictional force by which said pieces of material are conveyed.

16. A means for conveying pieces of material as set forth in claim 9, wherein said plurality of transfer elements include transfer surfaces, said transfer surfaces being arranged parallel to said conveying direction, said transfer surfaces having a frictional surface for creating a feeding frictional force by which said pieces of material are conveyed.

17. A means for conveying pieces of material as set forth in claim 10, wherein said plurality of transfer elements include transfer surfaces, said transfer surfaces being arranged parallel to said conveying direction, said transfer surfaces having a frictional surface for creating a feeding frictional force by which said pieces of material are conveyed.

* * * * *